June 2, 1970 R. G. PEACE ET AL 3,514,827
APPARATUS FOR FORMING HINGES IN ALL-PLASTIC BOOK COVERS
Filed Oct. 10, 1968

ROBERT G. PEACE
GERARD V. DELAIRE
INVENTORS

BY William J. French
George P. Chandler
ATTORNEYS

3,514,827
APPARATUS FOR FORMING HINGES IN ALL-PLASTIC BOOK COVERS
Robert G. Peace and Gerard V. Delaire, Kingsport, Tenn., assignors to Eastman Kodak Company, Rochester, N.Y., a corporation of New Jersey
Filed Oct. 10, 1968, Ser. No. 766,409
Int. Cl. B26d 1/12; B27g 13/00
U.S. Cl. 29—103     3 Claims

ABSTRACT OF THE DISCLOSURE

Apparatus for forming hinges in a sheet of thermoplastic material including a rotary cutting tool and having flutes with cutting edges formed along their outer extent. The end of the cutting tool also has edges extending radially outward from the center of the tool to intersect the cutting edges on the flutes. The outer end of the cutting tool is beveled and rounded such that surfaces joining the cutting edges form the frustum of a right-circular cone in which the edge joining the surfaces is rounded.

---

This invention relates to apparatus for forming a hinge area in thermoplastic material. More particularly, this invention relates to a rotary cutting tool having a cofiguration especially adapted for forming hinge areas in thermoplastic materials.

The many advantages inherent in the use of thermoplastic materials in manufacturing book backs, notebooks, and the like have led to wide spread acceptance of such materials in these applications. Many different methods and apparatus have been developed and utilized for forming the hinges in such materials including heated V-shaped stamping bars and the like. The use of such stamping bars is acceptable when the book construction is square-backed. The major portion of books currently produced, however, are of a round-back construction, thus creating a need for a wide hinge which can be made to conform to the recessed joint area of such books. A hinge of this description is, however, difficult to form with a stamping bar.

A wide hinge can be formed in a book back utilizing material removal operations which are conventional in metal working applications. These include milling, routing, skiving, or the like. In the past, however, machined hinges have been attempted on polyolefin-type plastic sheeting materials such as polypropylene, polyethylene, polyallomer, and the like, with no success since when such conventional machining operations were used with polyolefins, the cut was rough and welds between the hot, soft, plastic material which had been removed and the plastic sheet were common. Further, difficulties were encountered in maintaining proper cutting depth as the cutting tools would dig into the sheet and pull it away from the feed table. All of these shortcomings led to the belief prior to the instant invention that it was impossible to satisfactorily machine a hinge into a polyolefin material.

The above enumerated difficulties have been overcome in accordance with the instant invention in which an end milling cutter is modified to especially adapt it for use on thermoplastic materials. These modifications include beveling and rounding the end of a conventional milling cutter into a shape such that the cutting edges thereon lie on surfaces which generate the shape of a frustum of a frustum of a right circular cone with the edge between these surfaces rounded. The height of the conical frustum is made deeper than the depth of hinge to be cut so as to provide a clearance between the base of the conical portion of the tool and the upper surface of the sheet being machined.

Accordingly, it is an object of this invention to provide apparatus for machining wide hinges into all-thermoplastic book covers.

This and other objects of the invention will be more apparent upon reference to the following detailed description, appended claims, and drawings wherein:

Figure 1:
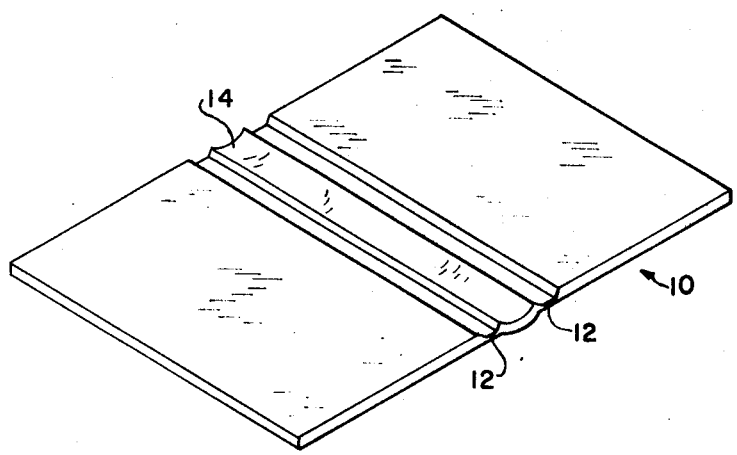
FIG. 1 is a view of a round backed book cover having hinges formed therein according to the instant invention.

With continued reference to the accompanying figures wherein like numerals designate similar parts throughout the various views, and with initial attention directed to FIG. 1, reference numeral 10 designates generally a book back having hinge areas 12 formed therein. These hinge areas 12 are relatively wide since the book back 10 is of the round back 14 construction.

Figure 2:
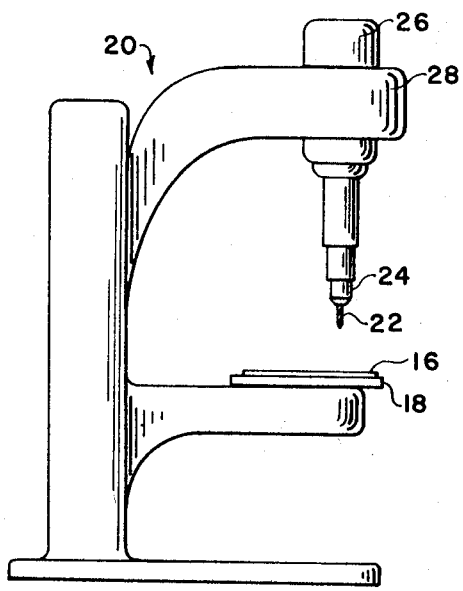
FIG. 2 is an illustration of a machine tool having an end milling cutter mounted therein for forming the hinges in the book back illustrated in FIG. 1.

As is best shown in FIG. 2, the hinge areas 12 are formed by placing a sheet of thermoplastic material 16 on the feed table 18 of a vertical milling machine designated generally as 20. An end milling cutter 22 is mounted in a chuck 24 which is driven by a motor 26 mounted in an outwardly extending arm 28. As is usual in this type of machine tool the feed table 18 and the cutter 22 can be moved vertically relative to one another to adjust the depth of cut in the sheet 16 as desired. The feed table 18 is also movable in the horizontal plane relative to the cutter 22 either through manual action or by connection to a motive force. The operation and construction of this type of machine 20 is conventional and well known to those skilled in the art. Therefore, elaborate detailed description of such is unnecessary.

Figure 3:
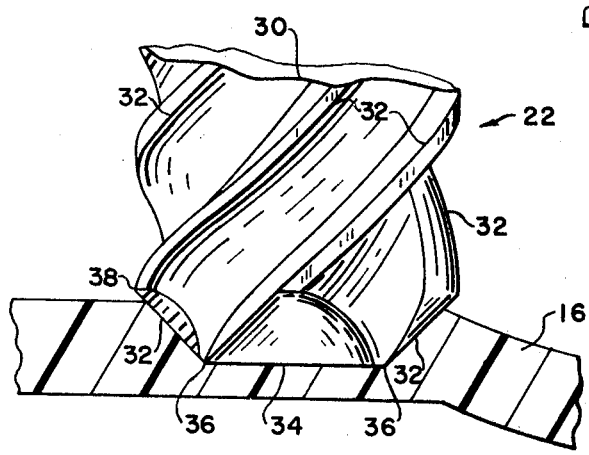
FIG. 3 is an enlarged, fragmentary view showing an end milling cutter modified in accordance with this invention to readily remove material from a portion of a plastic sheet to form a hing area therein.

The construction of the cutting tool 22 and operative relationship between it and the plastic sheet 16 are best illustrated in FIG. 3. As shown in this figure, the cutting tool 22 is an end milling cutter especially modified for use in removing material from a thermoplastic material. In this regard, the cutter 22 includes a plurality of helical flutes 30 formed on the body portion thereof with cutting edges 32 along their outer extent. As is conventional in such cutters, cutting edges 34 are also formed at the end of the body portion and extend radially outward from the center of the tool and intersect the cutting edges 32 on the flutes such as at point 36.

The end milling cutter is modified for use with thermoplastic materials by forming a bevel on the end of the body portion such that a surface joining all of cutting edges 32 and a surface joining all of cutting edges 34 will define the frustum of a right circular cone. A further aspect of this invention is that the edge of the conical frustum along which the surfaces are joined, previously designated as point 36, is rounded so that the small sharp edges which would otherwise be formed there and which would normally dig into the plastic being machined, will not be present.

A further aspect according to this invention is that the height of the conical frustum from the cutting edge 34 to the line 38 along which it joins the body of the cutting tool, is greater than the depth of the cut to be machined. Again, this eliminates any possibility of the formation of sharp corners which would tend to dig into the plastic. It has been found that it is desirable to have a height at least approximately 1/16" greater than the depth of cut to be machined.

If desired, a coolant can be utilized to enhance the smoothness of the cut especially if the plastic material is fed to the cutter at speeds of 30 to 40 feet per minute. Water sprayed directly onto the plastic sheeting immediately prior to cutting has been found to be adequate.

Utilizing the tool illustrated in FIG. 3 hinge areas from ¼" to ¾" wide have been formed in polyallomer sheeting. Generally a tool speed of 500 r.p.m. has been found to be satisfactory at a feed to the cutting tool of 50 inches per minute.

By the above detailed description, applicants have disclosed a unique apparatus for cutting a wide hinge in a thermoplastic book cover. This method and apparatus for forming a hinge have been found much superior to those previously utilized in its simplicity of operation, in the economics of operation, and in its ability to form a smooth cut.

The invention has been described in detail with particular reference to a preferred embodiment thereof, but it will be understood that variations and modifications can be effected within the spirit and scope of the invention as described hereinabove and as defined in the appended claims.

We claim:
1. Apparatus for cutting a hinge in a plastic hook cover comprising:
    (a) a rotary cutting tool having a body portion including a plurality of helical flutes thereon with cutting edges along the outer extent thereof;
    (b) the end of said body portion having cutting edges extending radially outward from the center of said tool to intersect said cutting edges on said flutes;
    (c) said end of said body portion having a shape such that surfaces joining the cutting edges formed thereon define the frustum of a right circular cone in which the edge joining said surfaces is rounded;
    (d) the height of said conical frustum being greater than the depth of cut to be made.

2. Apparatus according to claim 1 wherein the height of said conical frustum is about ⅟₁₆" greater than the depth of the cut to be formed.

3. Apparatus according to claim 2 wherein the diameter of the end of said body portion is about ½ the diameter of said body portion.

References Cited
UNITED STATES PATENTS

| | | | |
|---|---|---|---|
| 1,461,548 | 7/1923 | West | 77—67 |
| 1,950,087 | 3/1934 | Lind | 144—136 |

GIL WEIDENFELD, Primary Examiner

U.S. Cl. X.R.
144—2.19